US009478106B2

(12) United States Patent
Smith et al.

(10) Patent No.: US 9,478,106 B2
(45) Date of Patent: Oct. 25, 2016

(54) MULTIPLE GAMING CHOICE IN KENO BY PLAYERS

(71) Applicants: Ray Smith, Linden, NJ (US); Amanda Tears Smith, Linden, NJ (US)

(72) Inventors: Ray Smith, Linden, NJ (US); Amanda Tears Smith, Linden, NJ (US)

( * ) Notice: Subject to any disclaimer, the term of this patent is extended or adjusted under 35 U.S.C. 154(b) by 92 days.

(21) Appl. No.: 14/184,703

(22) Filed: Feb. 19, 2014

(65) Prior Publication Data

US 2015/0235506 A1 Aug. 20, 2015

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC ......... *G07F 17/329* (2013.01); *G07F 17/3244* (2013.01)

(58) Field of Classification Search
USPC ...................... 463/13, 18, 19, 20, 25, 39, 42
See application file for complete search history.

(56) References Cited

U.S. PATENT DOCUMENTS

2006/0179694 A1 8/2006 Akins
2007/0173312 A1 7/2007 Dodge
2008/0070670 A1 3/2008 Brunelle et al.
2009/0197664 A1 * 8/2009 Schultz .................. G07F 17/32 463/18
2014/0038680 A1 * 2/2014 Pececnik ............ G07F 17/3293 463/13

* cited by examiner

*Primary Examiner* — Adetokunbo O Torimiro
(74) *Attorney, Agent, or Firm* — Mark A. Litman & Associates, P.A.

(57) ABSTRACT

A method and apparatus for playing a casino wagering game using a processor to determine random event outcomes by:

the processor recognizing selection of individual player selections of individual sub-outcomes collectively forming a total player selection set;

the processor providing a total selection outcome of a final set of symbols randomly selected by the processor from a total symbol set of individual outcomes;

the individual total player selection set totaling fewer symbols than the total symbol set of individual outcomes;

a player input system enabling player wagers to be selected from among multiple total selection outcomes to be selected by the processor from among multiple available sets of total selection outcomes;

the processor providing differing paytables dependent upon numbers of symbols provided by the processor with respect to each total selection outcome provided by the processor from among the multiple available sets of total outcome selections.

24 Claims, 7 Drawing Sheets

| | | | | | | | | | |
|---|---|---|---|---|---|---|---|---|---|
| 1 | 2 | 3 | 4 | 5 | 6 | 7 | 8 | 9 | 10 |
| 11 | 12 | 13 | 14 | 15 | 16 | 17 | 18 | 19 | 20 |
| 21 | 22 | 23 | 24 | 25 | 26 | 27 | 28 | 29 | 30 |
| 31 | 32 | 33 | 34 | 35 | 36 | 37 | 38 | 39 | 40 |
| 41 | 42 | 43 | 44 | 45 | 46 | 47 | 48 | 49 | 50 |
| 51 | 52 | 53 | 54 | 55 | 56 | 57 | 58 | 59 | 60 |
| 61 | 62 | 63 | 64 | 65 | 66 | 67 | 68 | 69 | 70 |
| 71 | 72 | 73 | 74 | 75 | 76 | 77 | 78 | 49 | 80 |

FIG. 2

MULTIPLE GAMING CHOICE IN KENO BY PLAYERS

BACKGROUND OF THE INVENTION

1. Field of the Invention

The present invention relates to the field of wagering games, particularly casino wagering games, and more particularly casino wagering games similar to well known wagering games such as Keno and variants of Keno.

2. Background of the Art

Keno is similar to Lotto. It was first introduced in China many years ago. The game was brought to the United States in the mid 1800's by Chinese immigrants who came to work in the mines and on the railroad. It is a very popular game and very easy to play. It is an exciting pastime and, most importantly, it offers the possibility of winning large payouts on relatively small wagers.

Keno is usually played in Casino lounges specifically allocated for the game, but there are so called 'Keno runners' who will collect tickets and deliver the winnings if the player wants to play from outside the lounge area. There are many television monitors spread all over the Casino halls to keep players informed of the winning numbers. There is also the video version of Keno. These are video slot-like coin, credit or ticket-in operated machines. It plays using the same principle with similar rules of the regular Keno, but the results occur much faster.

To play Keno, a player selects a minimum of 4 but no more than 10 numbers between 1 and 80. Each selection is called a 'Spot', so if 10 numbers are selected, a 10 Spot game is being played. Keno tickets are located at tables throughout the Casino and in the Casino's Keno lounge. The Casino provides a 'Keno crayon' for this purpose. A player simply marks a blank Keno ticket (or virtual electronic ticket on a gaming device) with the numbers of the selection. The ticket is presented to the Keno desk (or received by a processor that executes code to effect game play) with the wager and the clerk provides a duplicate ticket (or the processor indicates the selections on the video display). In a few minutes (or in less than a minute on electronic play), twenty numbered Keno balls will be drawn at random from a barrel containing 80 numbered balls (or 20 virtual balls or 20 random numbers are provided by a random number generator associated with and in communication with the processor), and if enough of the selected numbers are drawn, a winning event outcome occurs. The results are displayed on screens (or the video screen), called Keno boards, throughout the Casino.

Minimum bets can be as low as 5 cents, although some Casinos only accept bets of $1 or more. The house's Keno brochures give information about payoffs and various tickets that can be played. The amount of money won is dependent upon the type of ticket played and the number of 'spots' caught. A player may wager on as many tickets as desired. One could win as much as $50,000 on a $1 wager in some Casinos.

Basically, pick-10 Keno is a 10-20-80 game in which the player picks 10 numbers from 1 to 80, and the lottery draws 20. New York, Wisconsin and New Zealand all have 10-20-80 keno games. Usually keno is drawn daily. A few states, California's Hot Spot, Kansas, Maryland, Massachusetts, Oregon, Rhode Island, New York's Quick Draw, draw every five minutes which, of course, makes tracking complete records impossible.

Some keno games allow the player to pick fewer than 10 numbers. Others have smaller number fields to choose from.

In Colorado's 10-20-60 keno game, the lottery draws 20 from only 60 numbers. In Canada, Ontario's keno and Quebec's Banco 10-20-70, the lottery draws 20 from 70 numbers. In Michigan's pick-10 Keno, the lottery draws 22 numbers from 80. In Australia's 20-20-80 Keno, the player marks 20 numbers, and 20 are drawn from 80.

The round of a Keno game is called a Keno race. In many Casinos, 'multi-race' Keno is featured, where one can play a number of consecutive Keno races at one time. The house advantage on Keno varies according to the Keno game played. It is always around 30% or more. The chance of hitting one number in 80 is 0.25.

Many variants and side bet or bonus games have been developed for play with Keno. Published U.S. Patent Application Document No. 20080070670 (Brunelle) describes a keno game including a set of playable symbols, from which a set of player symbols are selected. A set of winning symbols are selected from a set of potential winning symbols, with the set of potential winning symbols including the set of playable symbols and at least one wild symbol. The wild symbol may match any one of the player symbols, none of the player symbols, or a range of player symbols. The playable symbols are preferably numbers. Payouts preferably follow a pay table having a weighted probability based on the total number of symbols in the set of potential winning symbols.

Published U.S. Patent Application Document No. 20070173312 (Dodge) describes a novel Keno game wherein a player selects up to ten numbers from a field of eighty numbers to be played and these numbers are compared to twenty numbers randomly selected by the game from the same field of numbers in a manner known in the prior art. When the player places one or more conventional bets on the outcome of the game, they now also place one or more side bets as to the number of hits or matches there will be between the player selected numbers and twenty numbers selected by the game computer. The player may place side bets on more than one number of hits or matches to increase their odds of achieving side bet winnings.

Published U.S. Patent Application Document No. 20070197664 (Schultz) discloses a keno game having a bonus round. The keno game provides a player with an additional opportunity to win, after the keno balls have been drawn, to add excitement and volatility to the standard keno game. According to one method, the gaming machine receives the player's input, with the player selecting one or more numbers. A keno draw, which includes a plurality of numbers from a keno pool, is then displayed to the player. A bonus round is initiated in response to a trigger event. The bonus round is a random selection of one or more numbers in addition to the numbers previously selected from the keno draw. The numbers selected from the bonus round are displayed to the player. The numbers selected by the player are evaluated again the numbers from the keno draw results as well as the bonus round, and a payout for any winning outcomes are awarded to the player.

Published U.S. Patent Application Document No. 20060179694 (Thomas) describes a method of playing a keno-type wagering game. The method includes conducting the keno-type wagering game at a gaming terminal. The keno-type wagering game has a plurality of game cards and a plurality of symbols. At least some of the plurality of symbols to be used by a player in the wagering game is displayed to the player. A first set of symbols from the plurality of symbols is selected, and applies to all of the plurality of game cards. The method further includes randomly generating a plurality of second sets of symbols from the plurality of symbols. Each of the plurality of second sets includes a first symbol and each of the first symbols of each of the plurality of second sets is displayed simultaneously. In response to at least one of the symbols of the plurality of second sets matching a symbol from the first set, the player receives an award.

Additional variations in the play of casino games, including Keno are desired in the art. All references cited herein are incorporated in their entirety by reference.

SUMMARY OF THE INVENTION

A method and apparatus for playing a casino wagering game using a processor to determine random event outcomes by:

the processor recognizing selection of individual player selections of individual sub-outcomes collectively forming a total player selection set;

the processor providing a total selection outcome of a final set of symbols randomly selected by the processor from a total symbol set of individual outcomes;

the individual total player selection set totaling fewer symbols than the total symbol set of individual outcomes;

a player input system enabling player wagers to be selected from among multiple total selection outcomes to be selected by the processor from among multiple available sets of total selection outcomes;

the processor providing differing paytables dependent upon numbers of symbols provided by the processor with respect to each total selection outcome provided by the processor from among the multiple available sets of total outcome selections

BRIEF DESCRIPTION OF THE FIGURES

FIG. 2 shows a standard keno number board.

DETAILED DESCRIPTION OF THE INVENTION

Figure 1:
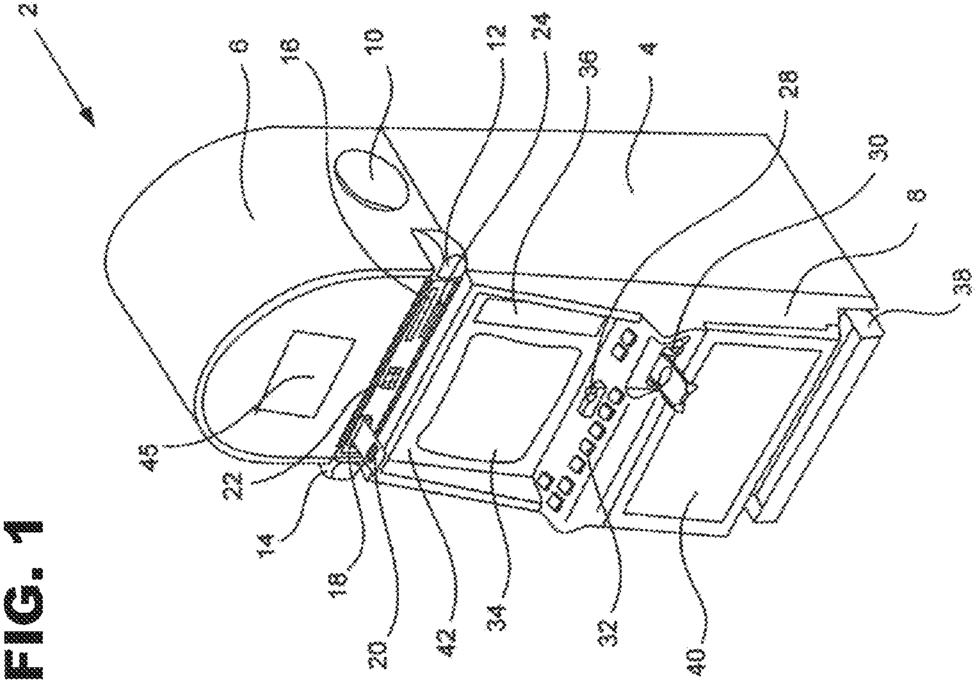
FIG. 1 shows an example of a gaming machine that may used in the present technology.

A general description of the present technology includes a method and apparatus for playing a casino wagering game using a processor to determine random event outcomes by:

the processor recognizing selection of individual player selections of individual sub-outcomes collectively forming a total player selection set;

the processor providing a total selection outcome of a final set of symbols randomly selected by the processor from a total symbol set of individual outcomes;

the individual total player selection set totaling fewer symbols than the total symbol set of individual outcomes;

a player input system enabling player wagers to be selected from among multiple total selection outcomes to be selected by the processor from among multiple available sets of total selection outcomes;

the processor providing differing paytables dependent upon numbers of symbols provided by the processor with respect to each total selection outcome provided by the processor from among the multiple available sets of total outcome selections.

The present technology includes a gaming system comprising a processor (which is often configured with random number generation functionality and game/outcome/wager/accounting functionality, a player input position with player input controls (e.g., wager input, alphanumeric selection, numbers of outcome alphanumerics to be used in wager outcome determination) and a video display system, wherein:

the processor is configured to execute code to recognize a wager at a player input position on a first wagering game. The first wagering game will be a variant of an underlying format of wagering game (e.g., keno, bingo, or any matching or correspondence in matching player selections with random selections) which will be described herein in greater detail. There may be a more conventional second wagering game played by a first player or by other players within the gaming system and apparatus;

the processor is configured to recognize selection at the player input position of both:

a) a first number of player selected alphanumerics (e.g., this is, for example, at least one number up to the number of player selected numbers allowed in the game, such as 1, 3, 4, 5, 6, 7, 8, 9, or 10 or more numbers selected by players typically in a keno game, or in a bingo card variant or in race track horse selections and the like; and b) a second number of processor randomly selected alphanumerics to be used in a processor performed comparison of the first number of player selected alphanumerics and the second number of processor randomly selected alphanumerics (e.g., as opposed to an automatic and only active number selection by the processor on game rules, the player gets to select the number of processor selected numbers that will be applied in a wager resolution comparison. Typically in keno, the game rules allow for exactly 20 such alphanumerics being selected for comparison. The game may still allow for 20 numbers to be selected, but in this wager, the player selects a number fewer than 20 that will be applied against the first number of alphanumerics (usually applying a different paytable than would be applied with a 20 number selection). The player, for example, may select or impose a game requirement that the first number of alphanumerics is compared to a second number less than the third number, such as 19, 18, 17, 16, 15, 14, 13, 12, 11, 10, 9, 8, 7, 6, 5, 4, 3, 2, or 1 alphanumeric against which the first number will be compared in the wager resolution of the first game and first wager.

The processor is configured to recognize and display on the video display system a third number of processor randomly selected alphanumerics (e.g., in keno the number would typically be 20, although not so limited in the present invention, in bingo until there was a bingo or until an imposed number is reached), wherein the third number of randomly selected alphanumerics is greater than the second number of processor randomly selected alphanumerics (e.g., 20>19; 20>18; etc.) and the second number of alphanumerics is used in at least one outcome determination in an underlying wagering game selected from the group consisting of bingo, keno and variants of bingo and keno;

the processor is configured to display the first number of player selected alphanumerics on the screen as an overlay on a complete set of available alphanumerics for play in the underlying wagering game. As is typical with keno, all 80 (or however many available numbers) are displayed in one format, player selected active numbers are highlighted, and then each subsequent randomly processor selected number (up to the maximum number selected third number of alphanumerics) will be further highlighted. The game may be played wherein the player selection of the second number (at a number below the maximum number allowed for the third number) will allow, enable or require the processor to select ONLY the second number and therefore display only the second number, converting the third number into the player selected second number;

the processor is configured to then display the second number of processor randomly selected alphanumerics and then to continue to display additional processor randomly alphanumerics until completion of display of the third number of processor randomly selected alphanumerics (e.g., note above where the third number may be converted to the second number which is less than a maximum available third number);

the processor configured to display outcome results by comparison of the first number of matched player selected alphanumerics with the second number of processor randomly selected alphanumerics; and the processor resolving the wager against a paytable based upon a degree of correspondence in the comparison of the first number of matched player selected alphanumerics with the second number of processor randomly selected alphanumerics.

Note the potential for and implementation of the variability in paytables and odds depending upon the first number and the second number (and generally with respect to the third number). This is because the probabilities and statistics for matching numbers and proportions of numbers alters with variations amongst the first, second and third numbers of alphanumerics. For example, where the first number selected by the player for game active numbers is eight (8) numbers, the probability of any specific number of those eight numbers being selected varies significantly if the second number is 8, 12, 15, 18 or 19 (in order of lower probability of occurrence) and all have lower probability than with twenty (20) numbers as the third number of processor randomly selected alphanumerics. Consequently, the payout would be higher for a specific number of "hits" (matches, correspondence) with lower numbers of processor randomly selected alphanumerics in the second number. It is intuitively understandable that there is a lower probability of three matches on eight first number player selections with 5 second number processor randomly selected alphanumerics as compared to 18 second number processor randomly selected alphanumerics. The payout odds must therefore be appropriately higher in the first instance than in the second instance.

The gaming system processor may be configured to execute code to resolve the wager at the player input position on a first wagering game based upon the comparison of the first number of matched player selected alphanumerics with the second number of processor randomly selected alphanumerics and/or the processor is configured to execute code to resolve the wager at the player input position on a first wagering game based upon the comparison of the first number of matched player selected alphanumerics with the third number of processor randomly selected alphanumerics; and/or the processor is also configured to execute code to resolve the wager at the player input position on a first wagering game based upon the comparison of the first number of matched player selected alphanumerics with the second number of processor randomly selected alphanumerics. Typically where the underlying game is keno, at least 80 numbers are available from which the processor may make random selections to provide the third number.

The gaming system may be played where the underlying game is keno and physical balls are randomly selected and electronic signals of the physical balls selection outcomes are provided as signals to the processor to enable the processor to recognize balls selected as randomly selected alphanumerics. As a non-limiting example, the first number may be 10 or fewer, the second number may be between 1 and 19 and the third number is at least 20. The underlying game may be keno and virtual keno balls are randomly selected by a random number generator and electronic signals of the virtual balls selection outcomes are provided as signals to the processor to enable the processor to recognize balls selected as randomly selected alphanumerics. The player input position may be at least a terminal with a wager selecting system selected from the group consisting of buttons and touchscreens. In one embodiment, in the gaming, exactly 20 ball selections are used as the processor randomly selected third number of alphanumerics and the player selected processor randomly selected alphanumerics comprise a first set of fewer than 20 ball selections that are displayed on the video display system.

A method of playing a side bet wagering game on a processor including a wager resolver, a display screen and a player input control, may include:

- the processor executing code to recognize a wager at a player input position on a first wagering game;
- the processor recognizing selection at the player input position of both:
  - c) a first number of player selected alphanumerics; and
  - d) a second number of processor randomly selected alphanumerics to be used in a processor performed comparison of the first number of player selected alphanumerics and the second number of processor randomly selected alphanumerics;
- the processor recognizing and displaying on the video display system a third number of processor randomly selected alphanumerics, wherein the third number of randomly selected alphanumerics is greater than the second number of processor randomly selected alphanumerics and the second number of alphanumerics is used in at least one outcome determination in an underlying wagering game selected from the group consisting of bingo, keno and variants of bingo and keno;
- the processor displaying the first number of player selected alphanumerics on the screen as an overlay on a complete set of available alphanumerics for play in the underlying wagering game;
- the processor displaying the second number of processor randomly selected alphanumerics and continuing to display additional processor randomly alphanumerics until completion of display of the third number of processor randomly selected alphanumerics;
- the processor determining and displaying outcome results by comparison of the first number of matched player selected alphanumerics with the second number of processor randomly selected alphanumerics; and the processor resolving the wager against a paytable based upon a degree of correspondence in the comparison of the first number of matched player selected alphanumerics with the second number of processor randomly selected alphanumerics.

This method may be executed wherein a wager on a game is received by a wager resolver; a random set of 20 numbers is provided by the wager resolver as the third number of processor randomly selected alphanumerics; the random set of numbers may be organized by the wager resolver into two sets of a second number of processor randomly selected second number of alphanumerics and a third number of processor randomly selected second number of alphanumerics.

An alternative description of a method of playing a casino wagering game using a processor to determine random event outcomes is as:

a) the processor recognizing selection of individual player selections of individual sub-outcomes collectively forming a total player selection set;
b) the processor providing a total selection outcome of a final set of symbols randomly selected by the processor from a total symbol set of individual outcomes;
c) the individual total player selection set totaling fewer symbols than the total symbol set of individual outcomes;
d) a player input system enabling player wagers to be selected from among multiple total selection outcomes to be selected by the processor from among multiple available sets of total selection outcomes;
e) the processor providing differing paytables dependent upon numbers of symbols provided by the processor with respect to each total selection outcome provided by the processor from among the multiple available sets of total outcome selections;
f) the processor completing a selection of a total selection outcome; and
g) the processor resolving the player wagers based upon degree of conformance of the total selection.

The method may generally include at least steps wherein A) the processor executes code to display a first arrangement of unique symbols within each frame prior to recognizing selection at the specific player position, and B) the processor executes code to display a second arrangement of the same unique symbols after recognizing selection at the specific player position and before resolving the wager, the first arrangement of symbols being different from the second arrangement of symbols with respect to distribution of symbols among the frames.

The method may be practiced wherein each frame of the grid has a unique 1 of 80 symbols displayed therein in the first arrangement, and/or wherein there is a single inactive symbol in a single frame of the grid in the first arrangement, and/or wherein the processor recognizes only selection of specific symbols at the player position and the processor executes code to randomly distribute the same unique symbols in step B), and/or wherein the processor executes code to select at least 20 symbols from the set of at least 80 separate and distinct symbols.

The method may also allow the processor to execute code to select at least 20 symbols from the set of at least 80 separate and distinct symbols. The method may also allow the processor to execute code so that one frame is occupied by an inactive symbol separate from the at least 80 symbols.

A Player may pick as few as 1 number or up to 1 less than the maximum allowed picks for a wager. A RNG (random number generator) would then select the remaining number(s) to complete the wager. If the game offers a choice of how many numbers to play, such as in Keno, player would make that selection before picking any numbers. Player would then pick as few or as many numbers as desired (up to one less than the amount of numbers being selected in total). The RNG would complete the wager selections based on the amount of numbers the player chose to play and the amount of numbers the player self-selected.

Keno:

Player may wager on 2 to 20 numbers.

Player may self-select from 1 to 19 numbers for their wager and elect for the RNG to auto-select the rest.

Lotteries:

Various versions of lottery require different amounts of numbers to be selected for the wager.

Player may play a pick 3 or pick 4 or may play a game that requires picking 5 or more numbers.

Player may self-select from 1 to 1 less than the required amount of numbers and elect for the RNG to auto-select the rest.

Horse Racing:

Player may play a Trifecta, Exacta or a combination of bets in one race or a set of races.

Player may self-select from 1 to 1 less than the required amount of numbers (racers) and elect for the RNG to auto-select the rest.

Bingo:

Player may pick numbers to create a Bingo Card or a bingo-style card.

Player may self-select from 1 to 1 less than the amount of numbers needed for the card and elect for the RNG to auto-select the rest.

Turning next to FIG. 1, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. Further, the top box 6 may house different or additional devices than shown in the FIG. 1. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

Gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modem general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc. that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines, such as gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, Netplex™ system of IGT is a proprietary communication protocol used for serial communication between gaming devices. As another example, SAS is a communication protocol used to transmit information, such as metering information, from a gaming machine to a remote device. Often SAS is used in conjunction with a player tracking system.

Gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into a gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in a gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 1, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Gaming Networks—Many implementations of the present invention may advantageously be practiced via a gaming machine network. Some such networks are described in U.S. patent application Ser. No. 11/225,407, by Wolf et al., entitled "METHODS AND DEVICES FOR MANAGING GAMING NETWORKS" and filed Sep. 12, 2005, which is incorporated herein by reference in its entirety and for all purposes.

Figure 1A:
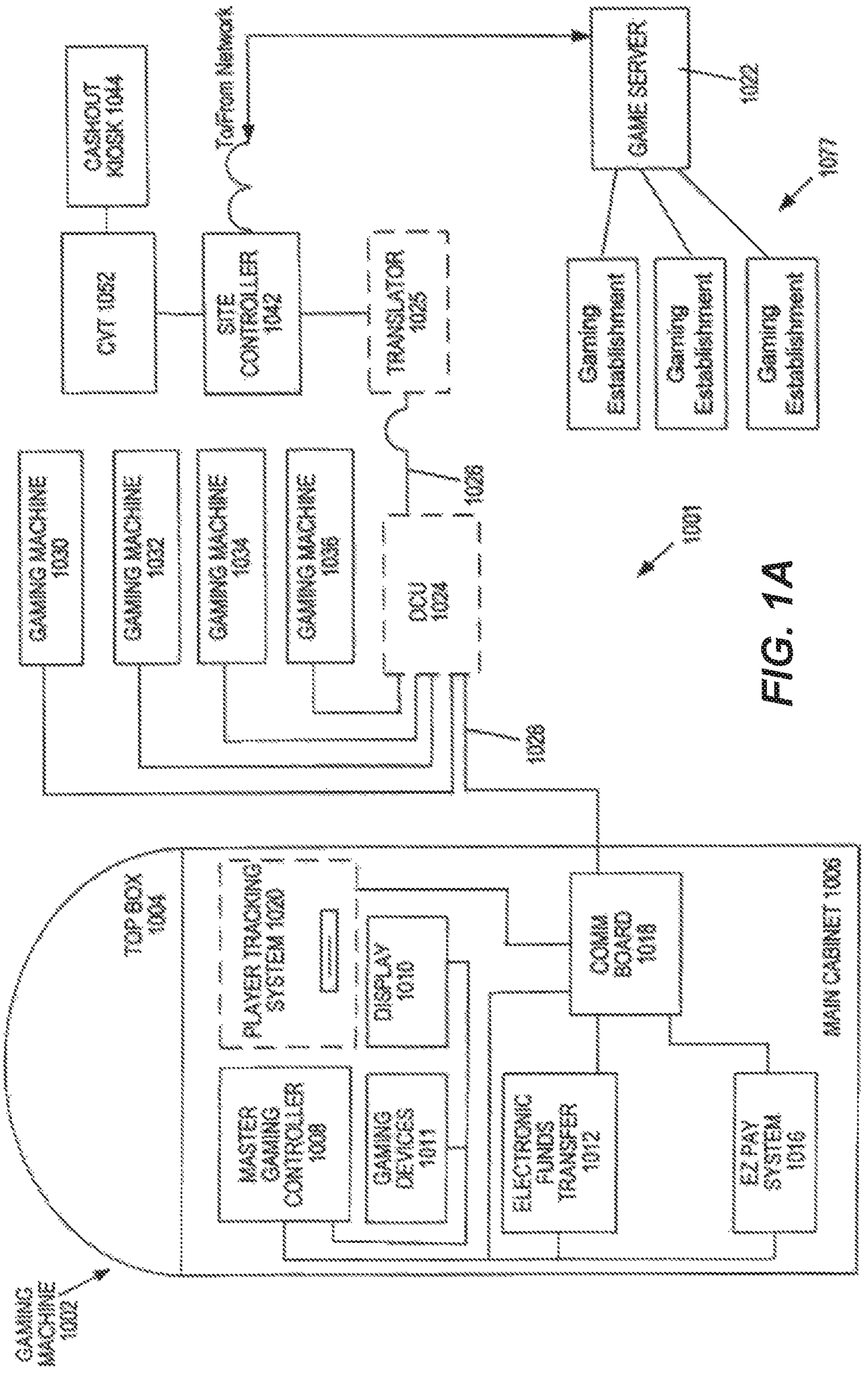
FIG. 1A shows another gaming network that may be used to implement some aspects of the invention.

Another gaming network that may be used to implement some aspects of the invention is depicted in FIG. 1A. Gaming establishment 1001 could be any sort of gaming establishment, such as a casino, a card room, an airport, a store, etc. In this example, gaming network 1077 includes more than one gaming establishment, all of which are networked to game server 1022.

Here, gaming machine 1002, and the other gaming machines 1030, 1032, 1034, and 1036, include a main cabinet 1006 and a top box 1004. The main cabinet 1006 houses the main gaming elements and can also house peripheral systems, such as those that utilize dedicated gaming networks. The top box 1004 may also be used to house these peripheral systems.

The master gaming controller 1008 controls the game play on the gaming machine 1002 according to instructions and/or game data from game server 1022 or stored within gaming machine 1002 and receives or sends data to various input/output devices 1011 on the gaming machine 1002. In one embodiment, master gaming controller 1008 includes processor(s) and other apparatus of the gaming machines described above in FIGS. 6 and 7. The master gaming controller 1008 may also communicate with a display 1010.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 1008 may also communicate with EFT system 1012, EZPay™ system 1016 (a proprietary cashless ticketing system of the present assignee), and player tracking system 1020. The systems of the gaming machine 1002 communicate the data onto the network 1022 via a communication board 1018.

It will be appreciated by those of skill in the art that embodiments of the present invention could be implemented on a network with more or fewer elements than are depicted in FIG. 1A. For example, player tracking system 1020 is not a necessary feature of some implementations of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment. Player tracking information may be combined with other information that is now readily obtainable by an SBG system.

Moreover, DCU 1024 and translator 1025 are not required for all gaming establishments 1001. However, due to the sensitive nature of much of the information on a gaming network (e.g., electronic fund transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machines are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems must be considered.

A network device that links a gaming establishment with another gaming establishment and/or a central system will sometimes be referred to herein as a "site controller." Here, site controller 1042 provides this function for gaming establishment 1001. Site controller 1042 is connected to a central system and/or other gaming establishments via one or more networks, which may be public or private networks. Among other things, site controller 1042 communicates with game server 1022 to obtain game data, such as ball drop data, bingo card data, etc.

In the present illustration, gaming machines 1002, 1030, 1032, 1034 and 1036 are connected to a dedicated gaming network 1022. In general, the DCU 1024 functions as an intermediary between the different gaming machines on the network 1022 and the site controller 1042. In general, the DCU 1024 receives data transmitted from the gaming machines and sends the data to the site controller 1042 over a transmission path 1026. In some instances, when the hardware interface used by the gaming machine is not compatible with site controller 1042, a translator 1025 may be used to convert serial data from the DCU 1024 to a format accepted by site controller 1042. The translator may provide this conversion service to a plurality of DCUs.

Further, in some dedicated gaming networks, the DCU 1024 can receive data transmitted from site controller 1042 for communication to the gaming machines on the gaming network. The received data may be, for example, communicated synchronously to the gaming machines on the gaming network.

Here, CVT 1052 provides cashless and cashout gaming services to the gaming machines in gaming establishment 1001. Broadly speaking, CVT 1052 authorizes and validates cashless gaming machine instruments (also referred to herein as "tickets" or "vouchers"), including but not limited to tickets for causing a gaming machine to display a game result and cash-out tickets. Moreover, CVT 1052 authorizes the exchange of a cashout ticket for cash. These processes will be described in detail below. In one example, when a player attempts to redeem a cash-out ticket for cash at cashout kiosk 1044, cash out kiosk 1044 reads validation data from the cashout ticket and transmits the validation data to CVT 1052 for validation. The tickets may be printed by gaming machines, by cashout kiosk 1044, by a stand-alone printer, by CVT 1052, etc. Some gaming establishments will not have a cashout kiosk 1044. Instead, a cashout ticket could be redeemed for cash by a cashier (e.g. of a convenience store), by a gaming machine or by a specially configured CVT.

Some methods of the invention combine information that can be obtained from game network accounting systems with features described above. By combining, for example, information regarding scheduled gaming machine configurations and information regarding the amount of money that a gaming machine brings in while a gaming machine has a particular configuration, gaming machine configurations may be optimized to maximize revenue. Some such methods involve determining a first rate of revenue obtained by a gaming machine in the gaming network during a first time when the gaming machine has a first configuration. The gaming machine is later automatically configured according to second configuration information supplied by the SBG server, e.g., as scheduled by the Scheduler. A second rate of revenue, obtained by the gaming machine during a second time when the gaming machine has the second configuration, is determined, and so on.

After scheduling various configurations at various times, optimum configurations for the gaming machine may be determined for various times of day. The SBG system can them provide scheduled optimal configurations for the gaming machine at the corresponding times of day. Some implementations provide for groups (e.g., banks) of gaming machines to be automatically configured according to a predetermined schedule of optimal configurations for various times of day, days of the week, times of the year, etc.

In some such implementations, an average revenue may be computed, based on revenue from many gaming machines having the same configuration at the same time of day. These average revenues could be used to determine an overall optimal value for relevant time periods.

Figure 1B:
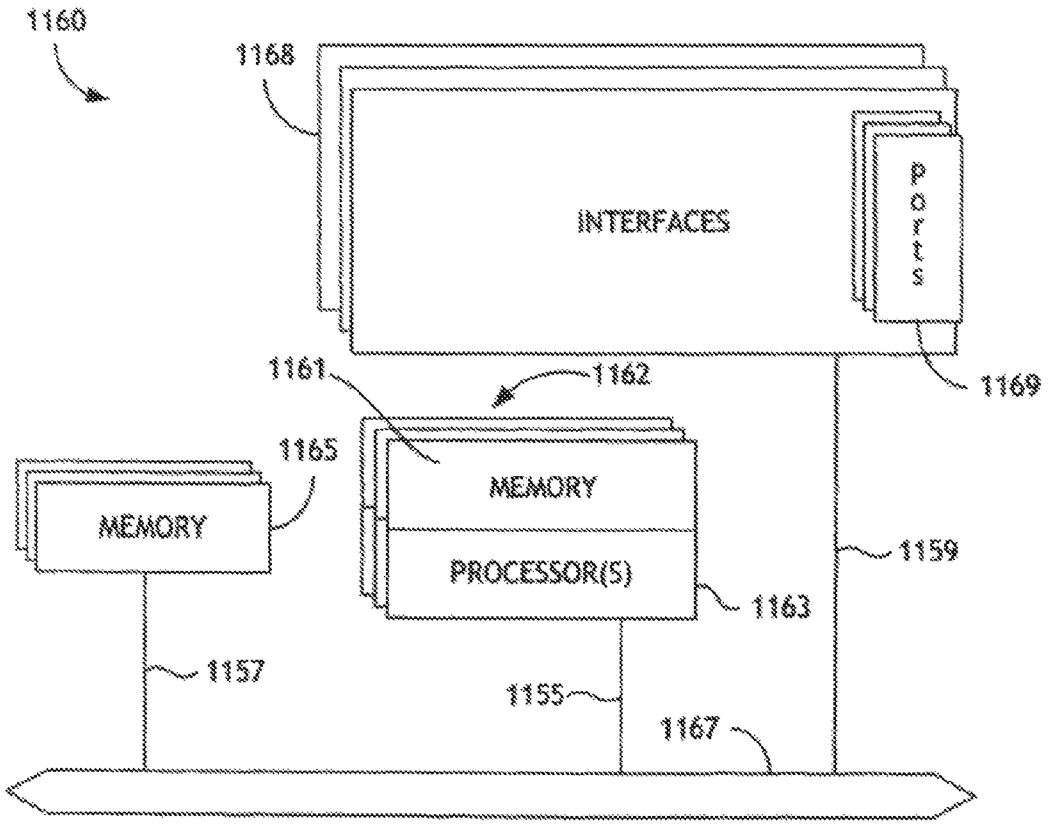
FIG. 1B illustrates an example of a network device that may be configured for implementing some methods of the present invention.

FIG. 1B illustrates an example of a network device that may be configured for implementing some methods of the present invention. Network device 1160 includes a master central processing unit (CPU) 1162, interfaces 1168, and a bus 1167 (e.g., a PCI bus). Generally, interfaces 1168 include ports 1169 appropriate for communication with the appropriate media. In some embodiments, one or more of interfaces 1168 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 1168 control such communications-intensive tasks as encryption, decryption, compression, decompression, packetization, media control and management. By providing separate processors for the communications-intensive tasks, interfaces 1168 allow the master microprocessor 1162 efficiently to perform other functions such as routing computations, network diagnostics, security functions, etc.

The interfaces 1168 are typically provided as interface cards (sometimes referred to as "linecards"). Generally, interfaces 1168 control the sending and receiving of data packets over the network and sometimes support other peripherals used with the network device 1160. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1162 may be responsible for implementing specific functions associated with the functions of a desired network device. According to some embodiments, CPU 1162 accomplishes all these functions under the control of software including an operating system and any appropriate applications software.

CPU 1162 may include one or more processors 1163 such as a processor from the Motorola family of microprocessors or the MIPS family of microprocessors. In an alternative embodiment, processor 1163 is specially designed hardware for controlling the operations of network device 1160. In a specific embodiment, a memory 1161 (such as non-volatile RAM and/or ROM) also forms part of CPU 1162. However, there are many different ways in which memory could be coupled to the system. Memory block 1161 may be used for a variety of purposes such as, for example, caching and/or storing data, programming instructions, etc.

Regardless of network device's configuration, it may employ one or more memories or memory modules (such as, for example, memory block 1165) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 1A illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 1B) or switch fabric based (such as a cross-bar).

FIG. 2 shows a standard keno number board. There are typically 80 separate symbols (numbers) from which player selections may be made.

Figure 3:
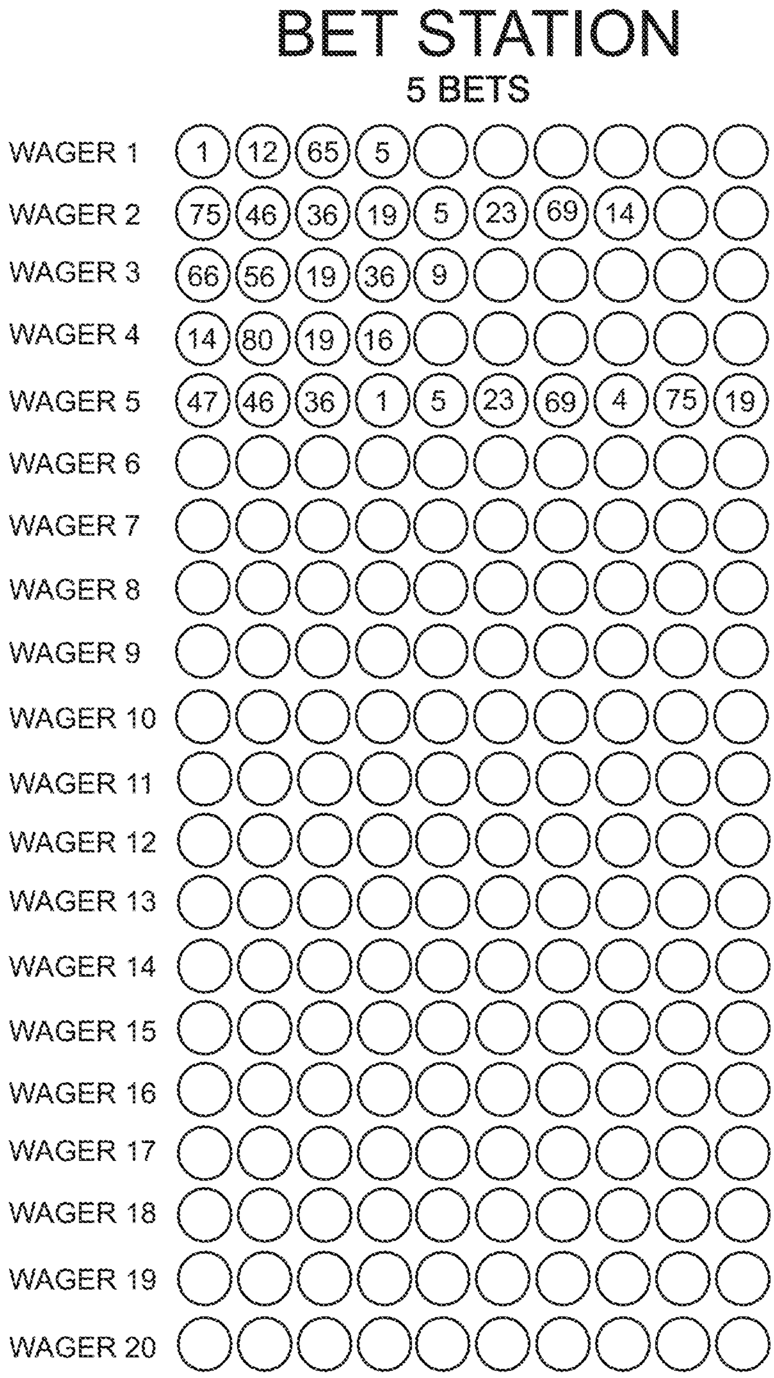
FIG. 3 shows a bet station display screen allowing up to twenty separate player wagers on which five different wagers have been made.

FIG. 3 shows a bet station display screen allowing up to twenty separate player wagers on which five different wagers (of different numbers of symbols) have been made.

Figure 4:
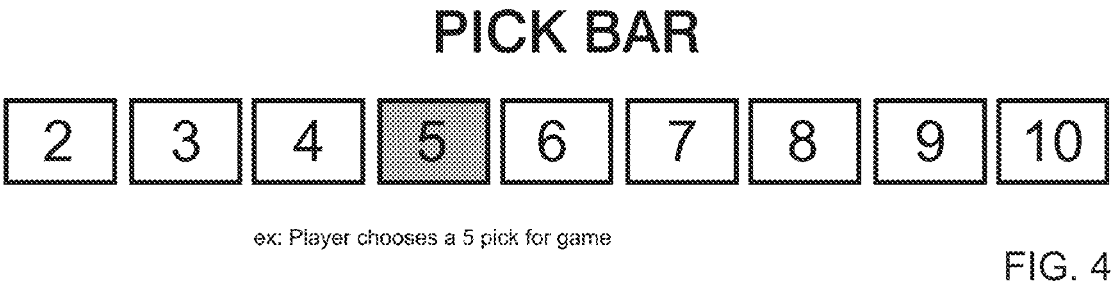
FIG. 4 shows an example of a betting bar or Pick Bar, with a player selection of 5 out of the 10 maximum player selections in a 20 number total selection out of 80 numbers.

FIG. 4 shows an example of a betting bar or Pick Bar, with a player selection of 5 out of the 10 maximum player selections in a 20 number total selection out of 80 numbers. Remaining random active numbers (those against which player selections will be compared) up to the number of active numbers to be used in the final pick (see FIG. 5) will be randomly selected by the processor.

Figure 5:
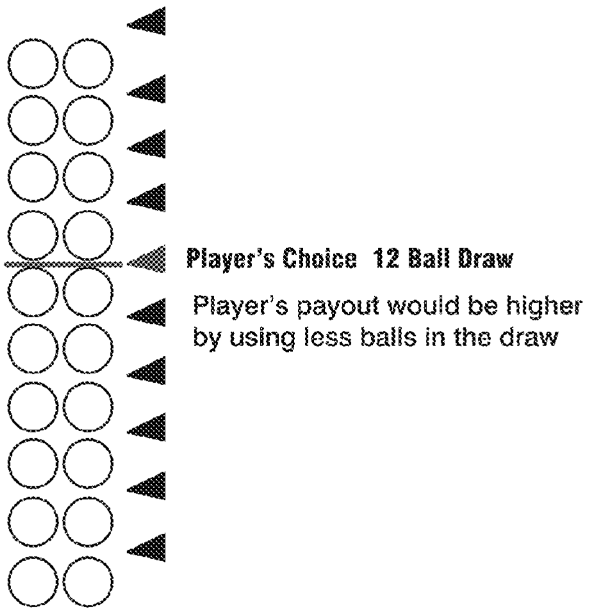
FIG. 5 shows a Player selection Bar indicating the number of total numbers selected out of the 80 numbers available.

FIG. 5 shows a Player selection Bar indicating the number of total numbers selected out of the 80 numbers available. As described, in keno there are usually twenty (20) numbers randomly selected (by balls or a processor) against which player selections, quick-pick selections or, in the practice of the present game, partial player selections then completion of selections by the processor. For example, if the player selects that 16 game determination active numbers (rather than the standard 20 numbers) will be used in game play, and then selects 8 numbers as the player selected active numbers that total ten number play, the processor will then automatically select the remaining 2 numbers (10−8) so that the game may be resolved upon delivery of the total 16 game active numbers.

Figure 6:
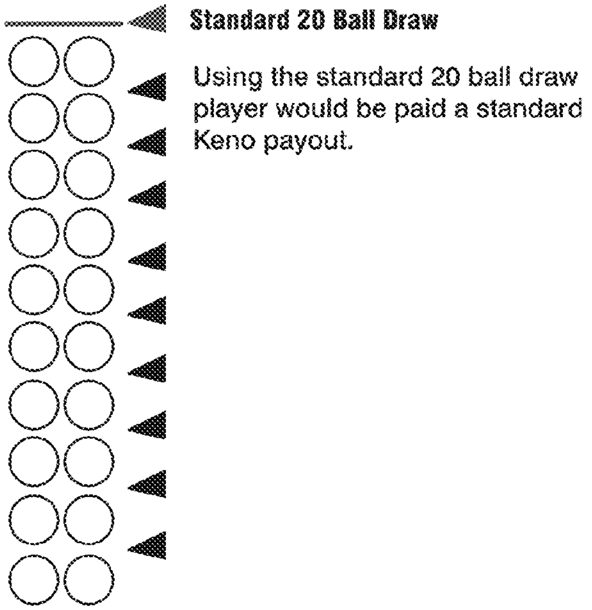
FIG. 6 shows a standard identification chart for indicating which actual numbers were chosen in a twenty ball selection.

FIG. 6 shows a standard identification chart for indicating which actual numbers were chosen in a twenty ball selection.

What is claimed:

1. A gaming system comprising a processor, player input position with player input controls and a video display system, wherein:

the processor is configured to execute code to recognize a wager at a player input position on a first wagering game;

the processor is configured to recognize selection at the player input position through the player input controls enabling direct player input for both:

a) a first number of player selected alphanumerics; and b) a second number of processor randomly selected alphanumerics to be used in a processor performed comparison of the first number of player selected alphanumerics and the second number of processor randomly selected alphanumerics, wherein the second number is selected by the player through a player input control to establish a predetermined maximum number of alphanumerics that is fewer than 20 total alphanumerics that may be randomly selected by the processor in providing both the second number of alphanumerics and a third number of alphanumerics randomly selected by the computer;

the processor is configured to recognize and display on the video display system the third number of processor randomly selected alphanumerics completing the predetermined maximum number of alphanumerics that may be randomly selected by the processor, wherein the third number of randomly selected alphanumerics is a total number greater than or equal to the second number of processor randomly selected alphanumerics and the second number of alphanumerics is used in at least one outcome determination in an underlying wagering game selected from the group consisting of bingo, keno and variants of bingo and keno;

the processor is configured to display the first number of player selected alphanumerics on the screen as an overlay on a complete set of available alphanumerics for play in the underlying wagering game;

the processor is configured to then display the second number of processor randomly selected alphanumerics and then to continue to display additional processor randomly alphanumerics until completion of display of the third number of processor randomly selected alphanumerics;

the processor is configured to display outcome results by comparison of the first number of matched player selected alphanumerics with the second number of processor randomly selected alphanumerics; and the processor configured to resolve the wager against a paytable based upon a degree of correspondence in the comparison of the first number of matched player selected alphanumerics with the second number of processor randomly selected alphanumerics, which is fewer than twenty alphanumerics.

2. The gaming system of claim 1 wherein the processor is configured to execute code to resolve the wager at the player input position on a first wagering game based upon the comparison of the first number of matched player selected alphanumerics with the second number of processor randomly selected alphanumerics.

3. The gaming system of claim 2 wherein the processor is also configured to execute code to resolve the wager at the player input position on a first wagering game based upon the comparison of the first number of matched player selected alphanumerics with the second number of processor randomly selected alphanumerics.

4. The gaming system of claim 3 wherein the underlying game is keno and at least 80 numbers are available from which the processor may make random selections to provide the third number.

5. The gaming system of claim 3 wherein the first number is 10 or fewer, the second number is between 1 and 19 and the third number is 20.

6. The gaming system of claim 3 wherein the first number is 10 or fewer, the second number is between 1 and 19 and the third number comprises 20.

7. The gaming system of claim 3 wherein exactly 20 ball selections are used as the processor randomly selected third number of alphanumerics and the player selected processor randomly selected alphanumerics comprise a first set of fewer than 20 ball selections that are displayed on the video display system.

8. The gaming system of claim 2 wherein the underlying game is keno and at least 80 numbers are available from which the processor may make random selections to provide the third number.

9. The gaming system of claim 8 wherein the player input position comprises a terminal with a wager selecting system selected from the group consisting of buttons and touchscreens.

10. The gaming system of claim 2 wherein the first number is 10 or fewer, the second number is between 1 and 19 and the third number comprises 20.

11. The gaming system of claim 1 wherein the processor is configured to execute code to resolve the wager at the player input position on a first wagering game based upon the comparison of the first number of matched player selected alphanumerics with the third number of processor randomly selected alphanumerics.

12. The gaming system of claim 11 wherein the player input position comprises a terminal with a wager selecting system selected from the group consisting of buttons and touchscreens, and the gaming system includes a ticket printer configured to print out game tickets on a background keno field, the gam ticket displaying the first number overlaid on the background keno field.

13. The gaming system of claim 1 wherein the underlying game is keno and at least 80 numbers are available from which the processor may make random selections to provide the third number.

14. The gaming system of claim 13 wherein the player input position comprises a terminal with a wager selecting system selected from the group consisting of buttons and touchscreens, and the gaming system includes a ticket printer configured to print out game tickets on a background keno field, the gam ticket displaying the first number overlaid on the background keno field.

15. The gaming system of claim 1 wherein the underlying game is keno and physical balls are randomly selected and electronic signals of the physical balls selection outcomes are provided as signals to the processor to enable the processor to recognize balls selected as randomly selected alphanumerics.

16. The gaming system of claim 15 wherein the first number is 10 or fewer, the second number is between 1 and 19 and the third number comprises 20.

17. The gaming system of claim 1 wherein the first number is 10 or fewer, the second number is between 1 and 19 and the third number is 20.

18. The gaming system of claim 1 wherein the underlying game is keno and virtual keno balls are randomly selected by a random number generator and electronic signals of the virtual balls selection outcomes are provided as signals to the processor to enable the processor to recognize balls selected as randomly selected alphanumerics.

19. The gaming system of claim 1 wherein the player input position comprises a terminal with a wager selecting system selected from the group consisting of buttons and touchscreens, and the gaming system includes a ticket printer configured to print out game tickets on a background keno field, the gam ticket displaying the first number overlaid on the background keno field.

20. A method of playing a side bet wagering game on a processor including a wager resolver, a display screen and a player input control, the method comprising:

the processor executing code to recognize a wager at a player input position on a first wagering game;

the processor recognizing selection at the player input position of both:

a first number of player selected alphanumerics; and b) a second number of processor randomly selected alphanumerics to be used in a processor performed comparison of the first number of player selected alphanumerics and the second number of processor randomly selected alphanumerics, wherein the second number is selected by the player through a player input control to establish a predetermined maximum number of alphanumerics that is fewer than 20 total alphanumerics that may be randomly selected by the processor in providing both the second number of alphanumerics and a third number of alphanumerics randomly selected by the computer;

the processor recognizing and displaying on the video display system the third number of processor randomly selected alphanumerics completing the predetermined maximum number of alphanumerics that may be randomly selected by the processor, wherein the third number of randomly selected alphanumerics is a total number greater than or equal to the second number of processor randomly selected alphanumerics and the second number of alphanumerics is used in at least one outcome determination in an underlying wagering game selected from the group consisting of bingo, keno and variants of bingo and keno;

the processor displaying the first number of player selected alphanumerics on the screen as an overlay on a complete set of available alphanumerics for play in the underlying wagering game;

the processor displaying the second number of processor randomly selected alphanumerics and continuing to display additional processor randomly alphanumerics until completion of display of the third number of processor randomly selected alphanumerics;

the processor determining and displaying outcome results by comparison of the first number of matched player selected alphanumerics with the second number of processor randomly selected alphanumerics; and the processor resolving the wager against a paytable based upon a degree of correspondence in the comparison of the first number of matched player selected alphanumerics with the second number of processor randomly selected alphanumerics.

21. The method of claim 20 wherein a wager on a game is received by a wager resolver;

a random set of exactly 20 numbers is provided by the wager resolver as the third number of processor randomly selected alphanumerics;

the random set of numbers is organized by the wager resolver into two sets of a second number of processor randomly selected second number of alphanumerics and a third number of processor randomly selected second number of alphanumerics.

22. A method of playing a casino wagering game using a processor to determine random event outcomes comprising: a) the processor recognizing selection of individual player selections of individual sub-outcomes collectively forming a total player selection set of ten or fewer; b) the processor providing a total selection outcome of a final set of symbols randomly selected by the processor from a total symbol set of individual outcomes; c) the individual total player selection set totaling fewer symbols than the total symbol set of individual outcomes; d) a player input system enabling player wagers to be selected from among multiple total selection outcomes to be selected by the processor from among multiple available sets of total selection outcomes and fewer than twenty total selection outcomes; e) the processor providing differing paytables dependent upon numbers of symbols provided by the processor with respect to each total selection outcome provided by the processor from among the multiple available sets of total outcome selections; f) the processor completing a selection of a total selection outcome with fewer than twenty alphanumerics; and h) the processor resolving the player wagers based upon degree of conformance of the total selection of fewer than twenty with the individual player selection of fewer than 10.

23. A method of engaging in a wagering game including wagering on random symbol selection in a gaming system comprising a processor, a player input terminal and a video display at the player input terminal, the method including at least steps of: the processor recognizing player wager input, and game play input from the player input terminal; game play input from the player input terminal comprising a player-directed selection of a first number of symbols for the player wager; the first number of symbols comprising at least one symbol and less than a second number of symbols which is fewer than 20 numbers, wherein the second number of symbols is a number of symbols that is used in the wagering game; the processor selecting a third number of random symbols, the third number of random symbols being sufficient to increase the first number of symbols to the second number of symbols to form a complete player set of second numbers of active game symbols which is again a total number fewer than 20 numbers; the processor then selecting a fourth number set of random symbols as chosen game symbols which is a total number up to a maximum of twenty numbers, the fourth number being greater than the third number forming the complete player set of active game symbols; the processor determining a degree of correspondence between symbols included in the second number of active gaming symbols and the fourth number of chosen game symbols; and the processor resolving the wager against a paytable in memory accessed by the processor, payout being in accord to the degree of correspondence.

24. The method of claim 23 wherein the wagering game comprises keno, the total amount of symbols for the fourth number of exactly 20 or fewer, at least one wager is placed on the first number of symbols is available from a set comprising 80 available symbols; and the processor providing a randomly selected second number of symbols to complete the set of random third number of symbols; and recognizing the degree of correspondence as an outcome of the keno game.

* * * * *